March 5, 1963 S. H. A. SCHMAUS 3,080,097
MEASURING DISPENSER FOR LIQUIDS
Filed July 20, 1959 2 Sheets-Sheet 1

INVENTOR
SIEGFRIED H. A. SCHMAUS

March 5, 1963    S. H. A. SCHMAUS    3,080,097
MEASURING DISPENSER FOR LIQUIDS
Filed July 20, 1959    2 Sheets-Sheet 2

INVENTOR
SIEGFRIED H. A. SCHMAUS
BY
Pollard Johnston Smythe & Robertson
ATTORNEYS

United States Patent Office 3,080,097
Patented Mar. 5, 1963

3,080,097
MEASURING DISPENSER FOR LIQUIDS
Siegfried H. A. Schmaus, Philadelphia, Pa., assignor to Ametek, Inc., New York, N.Y., a corporation of Delaware
Filed July 20, 1959, Ser. No. 828,169
7 Claims. (Cl. 222—189)

The present invention relates to improvements in devices for dispensing liquid from inverted bottles.

Dispensing devices of the above referred to type are not new per se. However, prior known devices of this type are often susceptible to inaccurate operation so that either too much or too little liquid may be dispensed each time the device is operated.

The principal object of this invention is to provide a liquid dispensing device that will be as near fool-proof as possible.

Another object of this invention is to provdie such a dispenser having a dispensing plunger operable within a measuring cup and in which an outlet sealing portion of the plunger is at all times protected from foreign matter or objects being lodged beneath it and its seat at the outlet of the cup.

Another object of the invention is to provide such a dispenser in which a seal of the plunger at the inlet to the cup is protected at all times to prevent foreign objects from being lodged between it and a seat at the inlet to the cup.

Another object of this invention is to provide such a dispenser including an adjustable air valve that is rendered effective each time the plunger is operated, and in which means is provided to maintain a preset condition of said air valve at all times regardless of the manner in which the device is operated.

In one aspect of the invention, a liquid dispenser may include a housing, to the top of which may be removably mounted a device adapted to be locked to, and to support in inverted position, a bottle containing a liquid to be dispensed. A tubular member may be located within said housing and may be in sealing registry with tubular means forming part of the device that supports the inverted bottle. A dispensing cup may be removably attached to the lower end of the tubular member within the housing, and a reciprocable plunger may be located within the cup and may be provided with sealing elements at the inlet and outlet to the cup. The plunger may be provided with a thin fin extending upwardly into the tubular member to which the cup is attached.

In order to prevent the lodging of foreign objects between the sealing element on the plunger and a seat at the inlet to the cup, a helical baffle may be provided within the tubular member to which the cup is attached. It may be designed such that the vertical passage of the liquid being dispensed must follow a helical path and no annular washer-like object can pass the helical fin to become lodged between a seal on the reciprocable plunger and a seat at the inlet to the dispensing cup.

In another aspect of the invention, the lower end of the reciprocable plunger may be encased within a perforated sleeve of sufficient length so that the sealing end of the plunger remains within the sleeve throughout the reciprocative stroke of the plunger. In this way, any foreign objects in the nature of small steel balls and the like that are passed by the helical baffle will collect outside of the perforated sleeve and will not become lodged beneath the lower seal of the plunger and a seat at the outlet of the dispensing cup.

In still another aspect of the invention, an adjustable air valve may be provided for the dispensing cup to prevent an air lock from forming when the plunger is raised to empty the dispensing cup. This air valve may be adapted to open each time the plunger is raised and to seat each time the plunger descends. In order to maintain the adjustment of the air valve so that a proper seal is provided when it is closed, a releasable locking member may act upon an adjusting screw for the air valve in order to prevent vibrations due to the use of the device from causing the adjustment of the air valve to be disturbed.

The above, other objects and novel features of the invention will become apparent from the follownig specification and accompanying drawings which are merely exemplary.

Figures 1, 2:
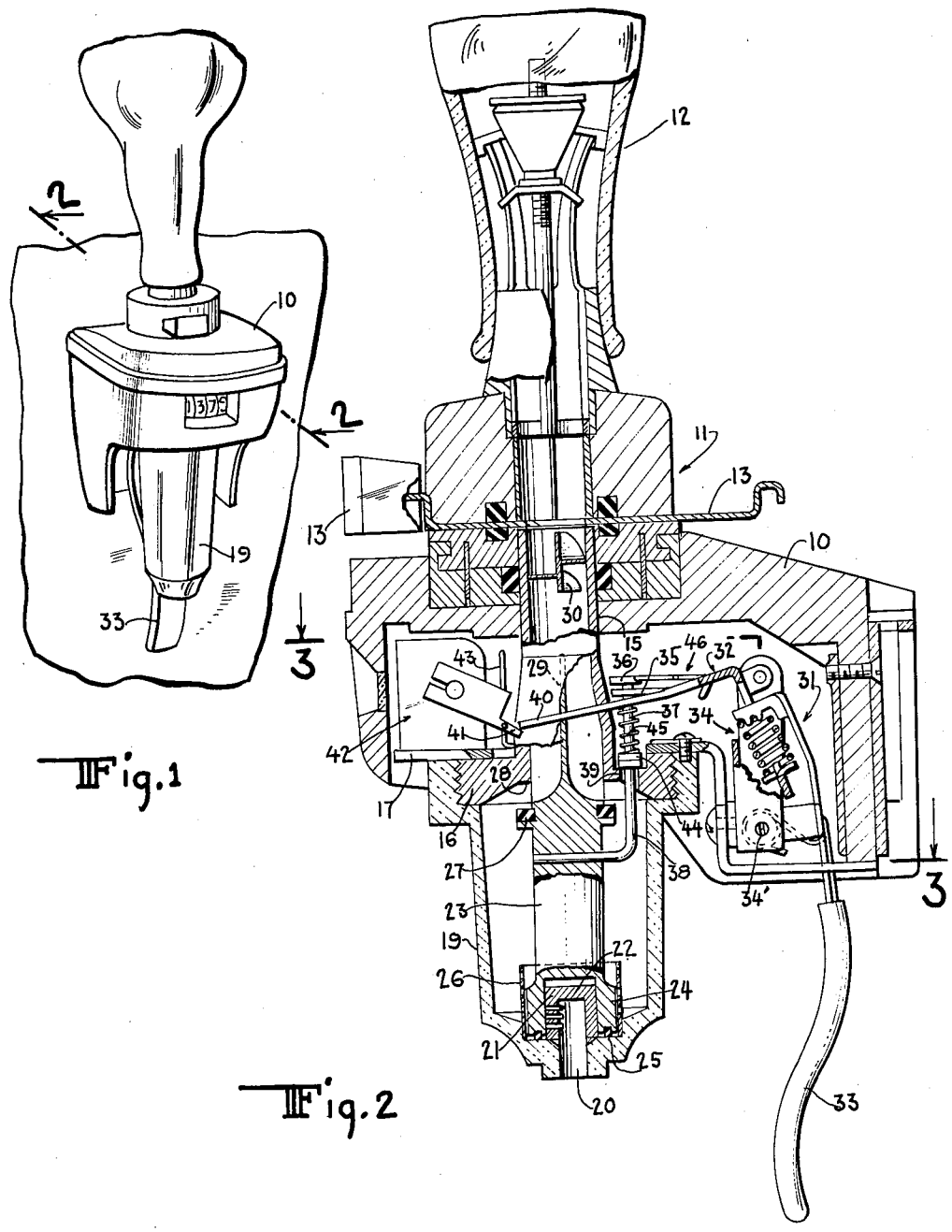
FIG. 1 is a perspective view of a liquid dispenser to which the principles of the invention have been applied.
FIG. 2 is an enlarged sectional elevational view taken substantially along line 2—2 of FIG. 1.

Referring to FIG. 2, the principles of the invention are shown as applied to a dispensing device including a base 10, in the top of which is mounted a sub-assembly 11 adapted to removably lock an inverted bottle 12 of liquid to be dispensed. The assembly 11 includes a slidable key 13 that effects the locking and unlocking of the assembly 11 to the housing 10. The specific locking device including assembly 11 forms no part of the present invention and is more fully described in United States Patent No. 2,559,815, filed July 10, 1951, in the name of Robert W. Woodward, to which patent attention is directed for specific details not specifically described herein.

A tubular member 15 may extend through the housing 10 and may include an enlarged threaded flange portion 16 rigidly secured to a plate 17. A cup 19 may include an internally threaded collar adapted to be screw-threaded to the flange 16. The construction and arrangement are such that a vertical passage extends from the bottle 12 downwardly through the tubular element 15 to the interior of the cup 19.

The cup 19 may include an outlet 20 which comprises a cylinder 21 fixed thereto, having its upper end 22 closed and its side wall perforated. A plunger 23 may be mounted within the cup 19 for vertical reciprocable movement, and it may include a cylindrical chamber 24 adapted to slidingly receive the cylinder 21. A sealing ring 25 may be fixed to the bottom of the plunger 23 which is adapted to seat on an annular surface surrounding the cylinder 21.

From the foregoing it is evident that raising the plunger 23 will cause liquid within cup 19 to pass through the perforated wall of cylinder 21, thence outwardly through the outlet 20 of cup 19. Also, when the plunger 23 is in its lowered position, the chamber 24 closes off the perforations in cylinder 21 and the seal 25 prevents loss of liquid past the bottom of plunger 23.

With the above construction, it is evident that foreign objects could descend through the tubular element 15 into the cup 19 and gravitate to a position, when the plunger 23 is elevated, where they could become lodged beneath the lower end of the plunger 23 and the surface containing the seat for the seal 25. Should this occur, the seal 25 on the plunger 23 would fail to seat with the result that the device would fail to function properly.

In order to overcome this possibility of failure, means has been provided to collect any such foreign objects and to retain them in a position where they cannot gravitate or be placed in a position to impair the sealing action of the seal 25. In the embodiment disclosed, this means takes the form of a tubular member 26 that may be fixed to cup 19 and act as a cylinder within which the bottom of the plunger 23 reciprocates. The length of the cylinder 26 is such that it is at least slightly greater than the full reciprocative stroke of the plunger 23, so that at no time is the top of the cylinder 26 opened by the bottom of the plunger 23 passing upwardly beyond the top of cylinder 26. The wall of the cylinder 26 is perforated with openings small enough to preclude passage of foreign objects large enough to prevent proper functioning of the seal 25. In this way, the operation of the plunger 23 in effecting a liquid-tight seal between seal 25 and the cup 19 is virtually assured.

The plunger 23 may also include an upper seal 27 adapted to seat on a surface 28 surrounding the inlet to the cup 19. The plunger 23 may also include a relatively thin blade or fin 29 extending upwardly along the axial centerline of the plunger 23 into the tubular element 15. The purpose of this blade 29 is to facilitate the smooth flow of liquid down tubular element 15 and into cup 19 without turbulence of the liquid. However, with such a construction it is possible to drop an annular washer or grommet down tubular element 15 prior to locking the subassembly 11 to housing 10. Such a washer could act to prevent effective action of the seal 27 on the surface 28 with the result that the device would be precluded from proper functioning.

Figure 4:
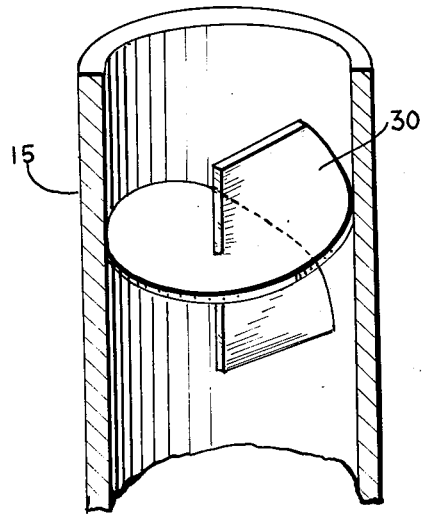
FIG. 4 is a perspective sectional view of a detail of the invention.

To overcome the above possibility of failure, means has been provided within the tubular element 15 which will provide an unrestricted passage of liquid and still preclude a foreign element such as a washer from being inserted over the fin 29 in a manner to prevent the proper functioning of the seal 27. In the embodiment disclosed, this means takes the form of a helical guide 30. Referring to FIG. 4, the guide 30 may comprise a relatively thin strip of rigid material that is fixed within tubular element 15 above the upper end of fin 29. The guide 30 may have a total rotational length in excess of 360° so that axial access through the element 15 is precluded. Furthermore, the width of strip 30 is preferably substantially equal to the internal radius of the element 15 so that no free axial passage exists through the helical guide 30.

Reciprocation of the plunger 23 is adapted to be effected by a snap-action triggering mechanism which per se forms no part of the present invention and which is more fully described in the above referred to patent to Woodward, to which patent reference is made for constructional details not specifically described herein. The mechanism 31 may include a plate member 32 that is connected to a trigger finger 33 through a snap-action toggle arrangement 34. When the finger 33 is moved clockwise about the pivot 34', the plate 32 moves upwardly.

The plate 32 may include a bifurcated member 35 adapted to receive the head 36 of a screw 37 that is adjustably threaded to rod 38. The rod 38 may be connected to the plunger 23 and may extend upwardly through a passage 39 within the threaded flange 16 to which cup 19 is attached.

The plate 32 also may include a finger 40 that engages a lever 41 of a Veeder-Root counter 42 mounted on the plate 17. The lever 41 of counter 42 is normally urged upwardly by a leaf spring 43, but normally held down by the finger 40 of the plate 32 when the trigger finger 33 is in its normal position as shown in FIG. 2.

The passage 39 within the flange 16 through which the rod 38 passes acts as an air valve for permitting the flow of liquid through the outlet 20 without which the cup would become air-locked. This passage must be provided with valve sealing means so that it will limit the flow of liquid into the cup as well as permit the free passage of air to the cup interior when plunger 23 is raised. Accordingly, the rod 38 includes a valve seal 44 that is urged downwardly against a shoulder on rod 38 by a spring 45 between the seal 44 and the bifurcated element 35 on plate 32. By turning the head 36, it is possible to vary the compression of spring 45, thereby varying the effectiveness of the air valve seal 44. The turning of the screw 37 also acts to prevent the snap-action toggle arrangement 34 from going beyond dead center which, if it were permitted to do, would not snap back to effect filling of the cup 19.

From the foregoing it is evident that the adjustment of the screw 37 is critical, not only to ensure a proper sealing action of the air valve seal 44, but also to ensure proper snap action of the toggle arrangement 34. Once the screw 37 has been properly adjusted, the continued snapping of the finger 33 during use of the device sets up vibrations tending to turn the screw 37, causing the device to become out of proper adjustment.

Figure 3:
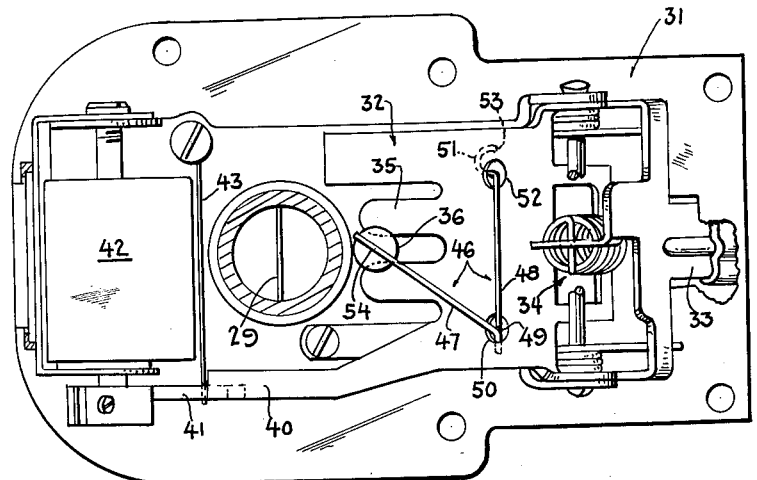
FIG. 3 is a sectional plan view taken substantially along line 3—3 of FIG. 2.

Referring to FIG. 3, means has been provided for ensuring the retention of the screw 37 in proper adjustment. It may comprise an irregularly shaped spring wire 46. The wire spring 46 may comprise angularly arranged legs 47 and 48 within the same or parallel planes. The legs 47 and 48 may be connected by a U-shaped, depending portion 49 adapted to be received within a recess 50 extending through the plate 32. The free end of leg 48 may be provided with a hook-like portion 51 adapted to extend through another recess 52 within plate 32 and its free end 53 adapted to engage the undersurface of plate 32, thereby anchoring the leg 48 to the plate 32. The free end of leg 47 may rest within the groove 54 within the head 36 of the screw 37, when the latter is in its properly adjusted rotative position.

From the foregoing it is evident that the screw 37 will be retained in adjusted position regardless of the vibrations set up during the operation of the device.

Although the various features of the new and improved liquid dispensing device have been shown and described in detail to fully disclose several embodiments of the invention, it will be evident that numerous changes may be made in such details and certain features may be used without others without departing from the principles of the invention.

What is claimed is:

1. In a liquid dispenser, a housing; means on said housing for attaching a bottle of liquid in inverted position; a hollow member having upper and lower ends within said housing through which liquid from said bottle is adapted to pass; a cup having an inlet and an outlet, said cup being removably fastened to the lower end of said hollow member; a reciprocable plunger within said cup having a cylindrical chamber at the lower end thereof; a sealing ring at the lower end of said plunger and adapted to seat on a surface within said cup and surrounding said outlet; cylindrical means having perforated side walls forming part of said outlet, received within and slidingly contacting the inner wall of said chamber, said cylindrical means extending up into said cup for guiding the plunger, liquid passing through said perforated side walls when the plunger is raised; and a perforated sleeve mounted within said cup within which said plunger reciprocates and that telescopingly cooperates with the side wall of said plunger, said plunger closely fitting within said sleeve.

2. In a liquid dispenser, a housing; means on said housing for attaching a bottle of liquid in inverted position; a hollow member having upper and lower ends within said housing through which liquid from said bottle is adapted to pass; a cup having an inlet and an outlet, said cup being removably fastened to the lower end of said hollow member; a reciprocable plunger within said cup having a cylindrical chamber at the lower end thereof; a sealing ring at the lower end of said plunger and adapted to seat on a surface within said cup and surrounding said outlet; cylindrical means having perforated side walls forming part of said outlet, received within and slidingly contacting the inner wall of said chamber for guiding the plunger, liquid passing through said side walls when the plunger is raised; and a perforated sleeve mounted within said cup and having a length such that the bottom of said plunger remains within said sleeve throughout its reciprocative stroke and with which the sidewall of said plunger telescopingly cooperates, said plunger closely fitting within said sleeve.

3. In a liquid dispenser, a housing; means on said housing for attaching a bottle of liquid in inverted position; a hollow member having upper and lower ends within said housing through which liquid from said bottle is adapted to pass; a cup having an inlet and an outlet, said cup being removably fastened to the lower end of said hollow member; a plunger within said cup and reciprocable between an upper and a lower position; a plate pivotably mounted in said housing; an operating handle pivotally mounted on said housing and extending to the outside of said housing; toggle spring means connected between said plate and handle for oscillating said plate when said handle is swung; rod means having an adjustable screw connection engageable by said plate and a connection to said plunger, said spring means yielding if said plunger is stopped in its upward movement; a sealing ring on said plunger adapted to coact with a mating surface surrounding said inlet when said plunger is in its upper position; and a helical guide made of solid sheet material forming a helical passage through said hollow member for providing free access of liquid therethrough but for preventing the passage therethrough of objects capable of interfering with the proper functioning of said sealing ring and closing of said plunger by said toggle spring.

4. In a liquid dispenser, a housing; means on said housing for attaching a bottle of liquid in inverted position; a hollow member having upper and lower ends within said housing through which liquid from said bottle is adapted to pass; a cup having an inlet and an outlet, said cup being removably fastened to the lower end of said hollow member; a plunger within said cup and reciprocable between an upper and lower position, a plate pivotably mounted in said housing; an operating handle pivotally mounted on said housing and extending to the outside of said housing; toggle spring means connected between said plate and handle for oscillating said plate when said handle is swung; rod means having an adjustable screw connection engageable by said plate and a connection to said plunger, said spring means yielding if said plunger is stopped in its upward movement; a sealing ring on said plunger adapted to coact with a mating surface surrounding said inlet when said plunger is in its upper position; and a helical guide having a rotative length in excess of 360°, made of solid sheet material and forming a helical passage through said hollow member for providing free access of liquid therethrough but for preventing the passage therethrough of objects capable of interfering with the proper functioning of said sealing ring and closing of said plunger by said toggle spring.

5. In a liquid dispenser, a housing; means on said housing for attaching a bottle of liquid in inverted position; a hollow member having upper and lower ends within said housing through which liquid from said bottle is adapted to pass; a cup having an inlet and an outlet, said cup being removably fastened to the lower end of said hollow member; a plunger within said cup and reciprocable between an upper and a lower position, said plunger having axially spaced sealing means thereon for closing the inlet to said cup from said hollow member and opening the outlet from said cup when said plunger is in its one reciprocative position, and for closing the outlet from said cup and opening the inlet to said cup when in its other reciprocative position; a plate pivotally mounted within said housing; an operating handle pivotally mounted on said housing and extending from said housing; toggle spring means between said plate and operating handle so as to oscillatingly move said plate when said handle is swung, adjustable connection between said plate and said plunger including a screw member engageable with said plate and having a slot; a spring wire having angularly related leg portions; and means formed on one leg portion for passing through apertures in said plate to thereby anchor said spring wire to said plate, the other leg of said spring wire being so angularly located that it fits within said slot of said member forming part of said adjustable connection between said plate and plunger.

6. In a liquid dispenser, a housing; means on said housing for attaching a bottle of liquid in verted position; a hollow member having upper and lower ends within said housing through which liquid from said bottle is adapted to pass; a cup having an inlet and an outlet, said cup being removably fastened to the lower end of said hollow member; a plunger within said cup and reciprocable between an upper and a lower position, said plunger having a cylindrical chamber at the lower end of said plunger a sealing ring at the lower end of said plunger and adapted to seat on a surface within said cup and surrounding said outlet; cylindrical means having perforated side walls forming part of said outlet, received within and slidingly contacting the inner wall of said chamber, said cylindrical means extending up into said cup for guiding said plunger, liquid passing through said perforated side walls when the plunger is raised; perforated sleeve means within said cup and telescopingly cooperating with the outer wall of said plunger for preventing foreign particles from the interior of said cup from being lodged beneath the bottom of said plunger, said plunger closely fitting within said sleeve; another sealing ring on said plunger adapted to coact with a mating surface surrounding said inlet when said plunger is in its upper position; and a helical guide made of solid sheet material within said hollow member for providing free access of liquid therethrough but for preventing the passage therethrough of objects capable of interfering with the proper functioning of said other sealing ring.

7. In a liquid dispenser, a housing; means on said housing for attaching a bottle of liquid in inverted position; a hollow member having upper and lower ends within said housing through which liquid from said bottle is adapted to pass; a cup having an inlet and an outlet, said cup being removably fastened to the lower end of said hollow member; a plunger within said cup and reciprocable between an upper and a lower position, said plunger having a cylindrical chamber at the lower end thereof; a sealing ring at the lower end of said plunger and adapted to seat on a surface within said cup and surrounding said outlet; cylindrical means having perforated side walls forming part of said outlet, received within and slidingly contacting the inner wall of said chamber, said cylindrical means extending up into said cup for guiding said plunger, liquid passing through said perforated side walls when the plunger is raised; means having perforated walls within said cup and telescopingly cooperating with the outer wall of said plunger for preventing foreign particles from the interior of said cup from being lodged beneath the bottom of said plunger; another sealing ring on said plunger adapted to coact with a mating surface surrounding said inlet when said plunger is in its upper reciprocative position; a helical guide made of solid sheet material within said hollow member for providing free access of liquid therethrough but for preventing the passage therethrough of objects capable of interfering with the proper functioning of said other sealing ring by lodging between said sealing ring at the inlet; a spring actuated toggle means mounted within said housing and having an operating handle extending therefrom; a plate within said housing and connected to said toggle arrangement and adapted to be oscillated between an upper and a lower position; an adjustable connection between said plate and said plunger;

and means for maintaining said adjustable connection in a preset condition.

References Cited in the file of this patent

UNITED STATES PATENTS

| | | |
|---|---|---|
| 523,855 | Frye | July 31, 1894 |
| 1,327,708 | Guy | Jan. 13, 1920 |
| 1,935,128 | Pullman | Nov. 14, 1933 |
| 2,316,729 | Tryon | Apr. 13, 1943 |
| 2,631,755 | Woodward | Mar. 17, 1953 |
| 2,703,666 | Iannelli | Mar. 8, 1955 |
| 2,772,560 | Neptune | Dec. 4, 1956 |

FOREIGN PATENTS

| | | |
|---|---|---|
| 309,283 | Italy | July 1, 1933 |
| 695,129 | Great Britain | Aug. 5, 1953 |